United States Patent [19]
Davis et al.

[11] Patent Number: 5,483,530
[45] Date of Patent: Jan. 9, 1996

[54] SYSTEM AND METHOD FOR COMMUNICATING WITH DIGITAL AND ANALOG DEVICES VIA A SINGLE DIGITAL INTERFACE

[75] Inventors: Gordon T. Davis; Charles B. Dillon; Laurence V. Marks, all of Raleigh, N.C.

[73] Assignee: International Business Machines Corporation, Armonk, N.Y.

[21] Appl. No.: 166,996

[22] Filed: Dec. 16, 1993

[51] Int. Cl.⁶ ...................................................... H04J 3/02
[52] U.S. Cl. ........................................... 370/79; 370/110.1
[58] Field of Search ................................... 370/91, 85.13, 370/92, 93, 94.1, 94.2, 110.1, 77, 79, 110.2, 110.3, 110.4, 53, 58.1, 58.2, 68.1; 375/5, 7, 8; 379/90, 93, 94, 102, 105; 455/4.1, 4.2, 6.3, 68, 69, 70, 92, 353

[56] References Cited

U.S. PATENT DOCUMENTS 4,991,169  2/1991  Davis et al. ............................... 370/77
5,134,611  7/1992  Steinko et al. ......................... 370/110.1

Primary Examiner—Douglas W. Olms
Assistant Examiner—Huy D. Vu
Attorney, Agent, or Firm—Stephen T. Keohane; Michael G. Verga

[57] ABSTRACT

The invention is an ISDN terminal equipment which will maintain connectivity with existing analog modems by setting up a voice-grade connection to existing analog modems and using the power of a digital signal processor DSP to generate the digital equivalent of the analog modem signals for transmission on an ISDN "B" channel.

4 Claims, 6 Drawing Sheets

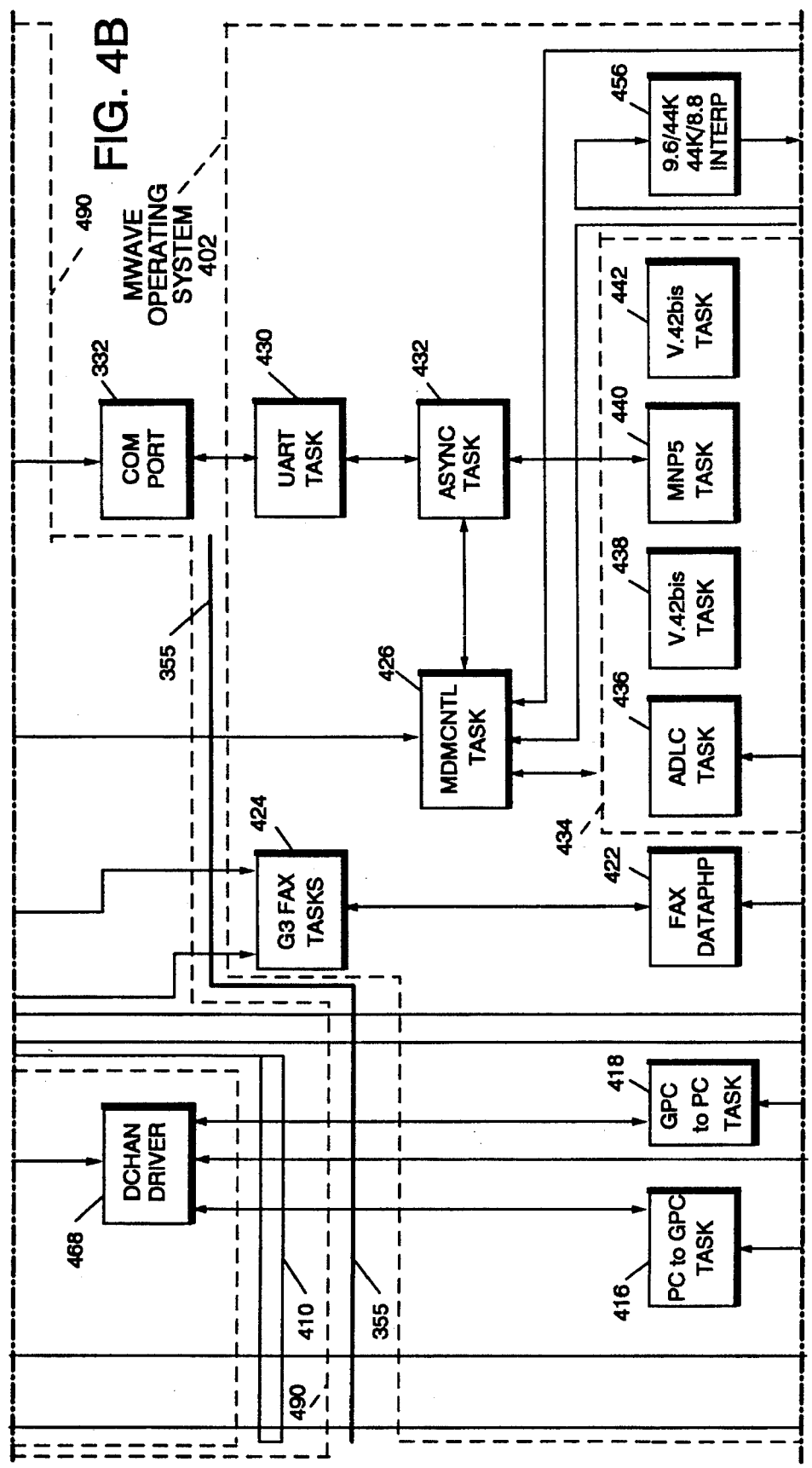

SYSTEM AND METHOD FOR COMMUNICATING WITH DIGITAL AND ANALOG DEVICES VIA A SINGLE DIGITAL INTERFACE

RELATED PATENT APPLICATIONS

U.S. Pat. No. 4,991,169 to Davis et al., entitled "Real-Time Digital Signal Processing Relative to Multiple Digital Communication Channels," discloses a digital signal processor which provides real time links between multiple time division channels of a digital system carrier system and host data processor. The disclosure of that application is incorporated herein by this and subsequent references.

U.S. Pat. No. 4,794,517 to Estebon et al., filed Apr. 15, 1985, entitled "Three Phased Pipelined Signal Processor," discloses other aspects of the digital signal processing system mentioned above pertaining to the pipelined organization of instruction execution. The disclosure of this application is also incorporated herein by this and subsequent references.

TECHNICAL FIELD

This invention relates generally to the field of data communications and, more particularly, to a system and method for enabling a computer system to communicate with analog and digital devices.

BACKGROUND OF THE INVENTION

I. Classes of Data Communications

Data communication connections may be classified by the type of connection which is established between the caller and callee (or endpoint). The two types of connections are (1) leased, wherein the connecting line permanently connects the caller and endpoint; and (2) switched, wherein a connection may be established between a caller and any one of multiple endpoints as required. Data communications connections may also be classified by the type of transmission technique which is used. They are (1) asynchronous (start/stop), wherein characters are transported as individual elements; and (2) synchronous, wherein characters are transported in contiguous packets. Thus, the data communications environment is divided into four classes represented by the combinations of the type of connection and transmission technique used.

The asynchronous leased-line class is virtually empty. With the possible exception of outmoded industrial or governmental installations persisting from the period when switched-line data communication was not believed to be feasible, there are few users in this class of Data Communications.

Formerly, the concentration was on synchronous leased-line concentrators and terminal controllers. These uses have become far outnumbered due to the proliferation of inexpensive personal computers and workstations which almost invariably use asynchronous transmission. These single user devices often include asynchronous communications capability as a standard feature of the machine.

Since switched-line communication is generally significantly less expensive than leased-line communication, and it is much more flexible, its acceptance has been much greater. Often no separate line cost need be considered. The popularity of switched-line communication is enhanced because it enables a personal computer to share an analog phone line otherwise used for voice communications. Thus, the most rapidly growing class of data communications is the asynchronous switched-line class.

II. Analog Technology in Data Communications

Despite the advent of digital networks, the use of analog technology to carry data has continuously increased. The number of modems which have been installed, especially asynchronous, switched-line modems, has grown significantly, and is expected to continue to do so in the future. This continued growth of analog technology in data communications has been attributed to a number of factors.

First, asynchronous modem capabilities have significantly improved since their introduction in the 1970s. Originally, data rates of asynchronous modems were from 0 to 300 bits per second (bps). Today, asynchronous modems have the capability of transferring data at rates of 14,400 bps and higher. For example, there are some proprietary modems with data rates of 28,800 bps. This represents a growth of nearly two orders of magnitude from their introduction.

Second, the upgrading of asynchronous modems enabled user systems to maintain downward application compatibility. Downward application compatibility is the capability to upgrade modem technology without requiring the addition of devices or software for the specific purpose of achieving workable interface connections between the applications programs and the modem. Downward application compatibility is maintained due to the continued use of a standard communications interface and the development of a de facto standard software interface.

Although modem technology has evolved through five generations in ten years, the interface to the modem has remained a constant: The EIA Standard RS-232, established by the Electronic Industries Association or its European equivalent, CCITT recommendations V.24 and V.28, established by the International Consultative Committee on Telegraphy and Telephony has been used throughout the evolution.

The original IBM Personal Computer lacked the ability to completely utilize the capabilities of the serial communications hardware. To utilize these capabilities with the limited power available, applications adopted the practice of directly manipulating the hardware. Thus, the image of a National Semiconductor INS 8250 Universal Asynchronous Receiver/Transmitter (UART), became a new standard interface between the applications programs and the communications hardware. Extensions have also been made to the UART, but these extensions maintain compatibility with older versions.

When accessed directly, the UART may be set to communication speeds from less than 300 bps to beyond 115 Kbps. Every time faster modems became available, the user merely changed a command or configuration to upgrade. Because the UART is accessed in the same manner for all communication rates, downward application compatibility has been maintained as data speeds were increased.

In addition to having a standard communications interface available, applications were able to take advantage of a de facto standard interface for setting and querying modem parameters and status, and for call setup and takedown. The AT command set, originally created by Hayes Corporation, was designed for use with non-programmable terminals. Its purpose was to permit control of the modem from the terminal by use of in-band signals. While this command set has been extended several times, the extensions have been consistent, and the base set has enabled applications to pass commands across the hardware interface. Thus, downward application compatibility was achieved. Expensive application software did not have to be replaced, and custom applications did not have to be rewritten as each new generation of modems was introduced.

Third, the upgrading of asynchronous modems enabled user systems to maintain downward connectivity compatibility. Similar to downward applications compatibility, downward connectivity compatibility is the capability to upgrade modem technology without the addition of devices or software for the specific purpose of achieving workable interface connections between the upgrade modems and the endpoints with which it communicates. Downward connectivity compatibility was achieved by requiring the faster speed modems to communicate at all the previous lower speeds and to maintain a standard communication protocol.

III. Introduction of ISDN

The Integrated Services Digital Network (ISDN) represents an emerging technology which is aimed at replacing the existing analog telephone network with an all digital network capable of handling digital communications as well as voice communications. Numerous suppliers are now offering ISDN interface adapters for personal computers; yet, sales of these products have been disappointingly low. In spite of the wealth of benefits to be achieved by installing ISDN, it has not yet received wide acceptance.

Several interrelated reasons have been identified for preventing the growth of ISDN. These include the high cost of ISDN equipment due to low sales volumes, the high cost and unavailability of ISDN applications, and the unavailability of support services.

Another reason given is that ISDN deployment is expected to be fragmented. Metropolitan areas may be served before rural areas; those areas with relatively strong infrastructures before the weak. This implementation of ISDN "islands" has inhibited ISDN acceptance because users are unwilling to replace a service that has no limitation on calling area with a service that can only reach nearby endpoints.

However, among the various problems impeding the growth of ISDN, connectivity seems to be the most significant factor. Connectivity refers to the ability of data communications equipment to operate and interface with both, the ISDN (digital) network and the analog network. This limitation effectively limits the set of ISDN potential ISDN users to those who create new networks of users that connect to only new endpoints, thereby enabling them to be completely digital.

For example, a user that is presently connected to greater than one endpoint who finds his productivity inhibited by bottlenecked data flow to or from a connection-point may be tempted to switch to ISDN as soon as the other endpoint did so. He would be less enthusiastic when he realized that he would have to maintain an analog telephone line and analog modem and adapter as well in order to continue to maintain communications with his other endpoints.

Another example of where upgrading present analog systems is more advantageous than converting to ISDN is when a number of users are in a wide-spread existing network. It is essentially impossible to upgrade all the endpoints in a network at once. However, in an analog network, piecemeal upgrading is possible because of the downward compatibility characteristics discussed above. It is possible, for example, for a user to get a 9600 bps modem to be used at 2400 bps in anticipation of a future network upgrade to 9600 bps.

One conventional ISDN adapter is described in commonly owned U.S. Pat. No. 4,991,169 to Davis et al. This adapter utilizes an ISDN Primary Rate adapter card with 30 time slots (time-division multiplexing of a 2.048 MHz serial bit stream), and allowed each time slot to be connected to a different analog modem at the other end of the network. This implementation focuses on connecting a computer to a multi-channel environment wherein many lines are terminated for a data base, terminal, or other remote processor access. This system, however, does not provide the capability to connect a computer to digital and analog devices via a single channel in a data link. In addition, the adapter disclosed in the above patent only communicates over channels in the time division multiplex link that are log PCM encoded for voice band analog signals.

Another conventional solution has been to communicate with both analog and digital devices using multiple interfaces; one for digital and one for analog. To implement such a solution, a system may have an adapter card that has a modem driving the analog interface and digital hardware driving the digital interface. This dual interface function does not have the benefits of a single interface nor does it have the benefits of communicating in an all digital method.

Another conventional solution is to use digital to analog and analog to digital convertors to convert modem signal to digital form prior to transmitting them over the digital network. One implementation of this approach has been to connect an external modem to an analog port in an ISDN adapter. The ISDN adapter digitizes the modem signals, multiplexes the signals with other digital signals, and then transmits them on to the digital network. The output of the remote modem is digitized by the network and is multiplexed into a digital channel to a receiver which demultiplexes the digital signal into several digital channels in the receiver which then converts the digital signal back to analog. However, the approach of adding an analog to digital converter to a modem chip results in distortion due to the multiple conversions which occur. In addition to distortion, these solutions also have a loss of accuracy with each conversion. This technique, however, has a higher cost than other techniques due to the extra components used for the analog conversions.

Since ISDN is a switched service, and since the greatest growth is in the asynchronous switched-line data communications class, it is desired to provide a means for ISDN users to interface with the asynchronous switched-line analog networks. Given the problems associated with the growth of ISDN discussed above, the adapter must be application downward compatible and downward connectivity compatible.

DISCLOSURE OF THE INVENTION

This invention relates generally to the field of data communications and, more particularly, to a system and method for enabling a computer system to dynamically communicate with analog and digital devices via a single channel within a time division multiplexing (TDM) or digital data link.

The present invention provides an ISDN terminal equipment which will maintain connectivity with existing analog modems by setting up voice-grade connection to existing analog modems and using the power of a MWAVE DSP to generate the digital equivalent of the analog modem signals for transmission on an ISDN "B" channel.

One feature of the present invention is that it may be used as a workstation communications adapter which communicates with both digital and analog devices via a single digital channel connecting to communication networks. One benefit of this capability to dynamically interface with both analog and digital equipment over a single digital channel is the lower costs involved with utilization of a single channel versus two channels. In many locations, tariffs are determined based upon the number of channels.

Another feature of the present invention is the capability of automatically encoding data as log PCM (pulse code modulation) analog signals when communicating with an analog device, such as a PSTN modem. The adapter of the present invention is capable of communicating with both analog and digital devices interchangeably over a single channel in a digital data link.

Another feature of the present invention is that it provides downward connectivity capability from devices connected to digital networks such as ISDN basic rate and Switched 56 with analog devices such as analog modems and fax machines. This enables a user to partially upgrade a network to ISDN.

Another advantage of the present invention is that it dynamically communicates with both analog and digital devices without generating or converting analog signals. The device performs these functions with a complete digital system. This eliminates the number of components as well as the distortion and signal loss resulting from converting signals from analog to digital and back to analog.

Another Advantage of the present invention is the capability of communicating through a single port in the workstation. The reduction from two interfaces to one at each remote workstation or personal computer (endpoint) in a digital network significantly reduces costs.

The foregoing and other features and advantages of the invention will be apparent from the following more particular description of preferred embodiments of the invention, as illustrated in the accompanying drawings.

BRIEF DESCRIPTION OF THE DRAWINGS

The foregoing and other features and advantages of the invention will be apparent from the following more particular description of the preferred embodiments of the invention, as illustrated in the accompanying drawings in which:

FIG. 4 comprising FIGS. 4A, 4B, and 4C, illustrates a functional block diagram of a software environment of the present invention.

BEST MODE FOR CARRYING OUT THE INVENTION

I. Overview of the Invention

The present invention is an ISDN adapter, which overcomes the shortcomings of prior offerings described above. This distinction is achieved by its capability to establish connections with digital and analog devices via a single digital interface to the communications network. The preferred embodiment of the adapter of the present invention dynamically establishes a connection with ISDN endpoints and analog modem endpoints in a Public Switched Telephone Network (PSTN) coupled to an ISDN.

The present invention maintains connectivity in existing communications software via COMM PORT emulation. The ISDN adapter of the present invention utilizes a Digital Signal Processor (DSP) to generate digitized replicas of modem signals which are transmitted over an ISDN B channel. A voice-band bearer service is requested during the ISDN call set-up, which results in the ability to route this B channel to the Public Switched Telephone Network, where in the preferred embodiment it may be connected to an analog modem or Facsimile machine.

II. Introduction of ISDN

A. System Environment

Figure 1:
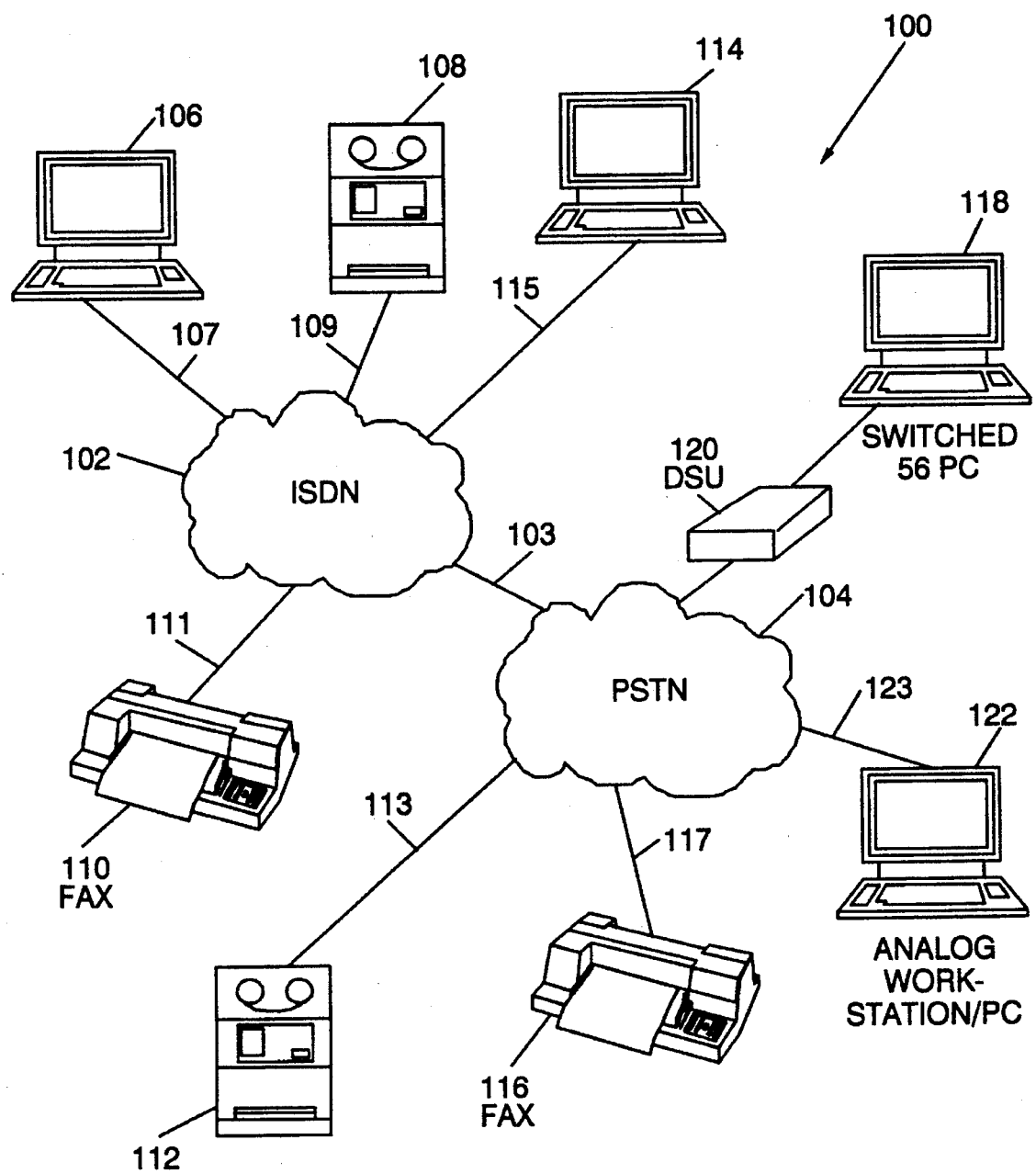
FIG. 1 illustrates a conceptual view of the ISDN and PSTN from a user connectivity perspective.

FIG. 1 illustrates a conceptual view of the ISDN and PSTN from a user connectivity perspective. Various users are connected to ISDN 102 by means of a local interface to a digital pipe of a certain bit rate. Pipes of various sizes are available to satisfy different needs. For example, a residential customer may require only sufficiently capacity to handle a telephone and videotext terminal. A business office, however, may need to connect to the ISDN via an on-premise digital PBX, and will require a much higher capacity digital pipe.

At any given time, the pipe to a user's premises has a fixed capacity, but the traffic on the pipe may be a variable mix up to the capacity limit. Thus a user may access packet-switched or circuit-switched services, as well as other services, in a dynamic mix of signal types and bit rates.

Illustrated in FIG. 1 are a number of user systems coupled to ISDN 102. First, a workstation 106 which includes the adapter constructed in accordance with the present invention, is connected to ISDN 102 via digital link 107. The preferred embodiment of the present invention is installed in a workstation or personal computer (PC). For purposes of this discussion, the computer platform on which the adapter of the present invention is installed is referred to as a workstation/PC. However, as one skilled in the relevant art will understand, the adaptor of the present invention may be installed in any type of computer platform.

Other users, such as host computer 108, are coupled to ISDN 102 via an ISDN Basic Rate or Primary Rate interface 109 (also discussed below). Other digital endpoints coupled to ISDN 102 include digital facsimile device 110, which is coupled to ISDN 102 via interface 111. Digital facsimile device 110 may be, for example, a G-IV facsimile device or a G-III facsimile device having an ISDN adapter. Interface 111 may also be Basic Rate or Primary Rate, but is typically a Basic Rate interface. In addition, there may be other devices with which workstation/PC 106 interfaces, such as workstation 114 which is coupled to ISDN 102 via some other type of ISDN interface 115.

FIG. 1 illustrates ISDN 102 coupled to PSTN 104. PSTN 104 is illustrated as a separate "network." However, there is in actuality a single digital network infrastructure which couples all endpoints shown in FIG. 1. The distinction is required, however, to illustrate that all analog devices are coupled to the digital network via an analog interface while all digital endpoints are coupled directly to ISDN 102 via a digital interface. The two networks have analogous digital infrastructures which are connected to each other via interface 103.

Each of the analog endpoints which are coupled to PSTN 104 are coupled via what is referred to as a PSTN modem. Each endpoint may require a different data rate. Examples of such analog devices are analog facsimile device 116. Analog facsimile device 116 may be a G-III facsimile which communicates with PSTN 104 via analog link 117 at 9600 bps. Other types of facsimile devices, such as the G-III+, operate at 14,400 bps.

Another analog device is analog workstation/PC 122, which communicates with PSTN 104 over interface 123 via any rate PSTN modem, from 300 to 14,400 bps, for example. Host computer 112 provides on-line database services such as lexis, nexis, prodigy, compuserve, MCI mail, etc. Such systems are coupled to PSTN 104 via interface 113 which operates at 300–14,400 bps data rate. Of course, this can be extended to higher bit rates as they become available.

Also connected to PSTN 104 is workstation 118 which is connected to PSTN 104 via a switched 56 interface via Data Service Unit (DSU) 120. This interface is an example of the various types of digital communications link with which the present invention may interface with.

In a preferred embodiment, the analog device with which the digital modem of the present invention communicates is an analog fax machine 116 or workstation 122. Fax machine 116 and workstation 122 are interfaced to ISDN 102 through a PSTN modem as described above. However, as will become apparent to one of ordinary skill in the relevant art, the present invention may communicate with any device which uses a PSTN modem as the means for interfacing with a network.

It should be noted that the system environment shown in FIG. 1 is an exemplary system environment illustrating the various analog and digital devices with which the digital modem of the present invention may interface with. As would be apparent to those skilled in the relevant art, the present invention may be extended to operate with other digital and analog systems.

B. ISDN Channels

The digital pipe between ISDN 102 and an ISDN user endpoint is used to carry a number of communication channels. The number of channels carried, and therefore, the capacity of each digital pipe, may vary from user to user, depending on user requirements. The transmission structure of any access link will be constructed from one or more B channels (64 kbps for voice and data) and a D channel (16 kbps for basic rate and 64 kbps for primary rate). These channel types are grouped into transmission structures that are offered as a package to the user.

As noted with reference to FIG. 1, the preferred embodiment of the present invention operates with the Basic Rate transmission structure, which consists of two full-duplex 64kbps B channels and a full-duplex 16 kbps D channel ("2B+D"). The total usable bit rate is 144 kbps. However, the clock rate at the physical interface is set at 192 kbps to account for framing, synchronization, and other overhead functions.

The B channel is the basic ISDN user channel. It can carry various types of traffic, such as PCM encoded digital voice, digital data for circuit-switched and packet-switched applications, and a mixture of lower rate traffic, including digital data and digitized voice which is encoded in fractions of 64 kbps. The D channel may be used to exchange control information between the user endpoint and the network or will support lower-speed digital data requirements.

Alternative embodiments of the present invention anticipate the implementation of the present invention to operate on a single B channel in other ISDN transmission structures, such as the Primary Rate transmissions structure. The Primary Rate transmission structure consists of 30B+1D or 23B+1D, with a resulting total usable bit rate of 2.048 Mbps and 1.544 Mbps, respectively.

C. Access Configuration

Figure 2:
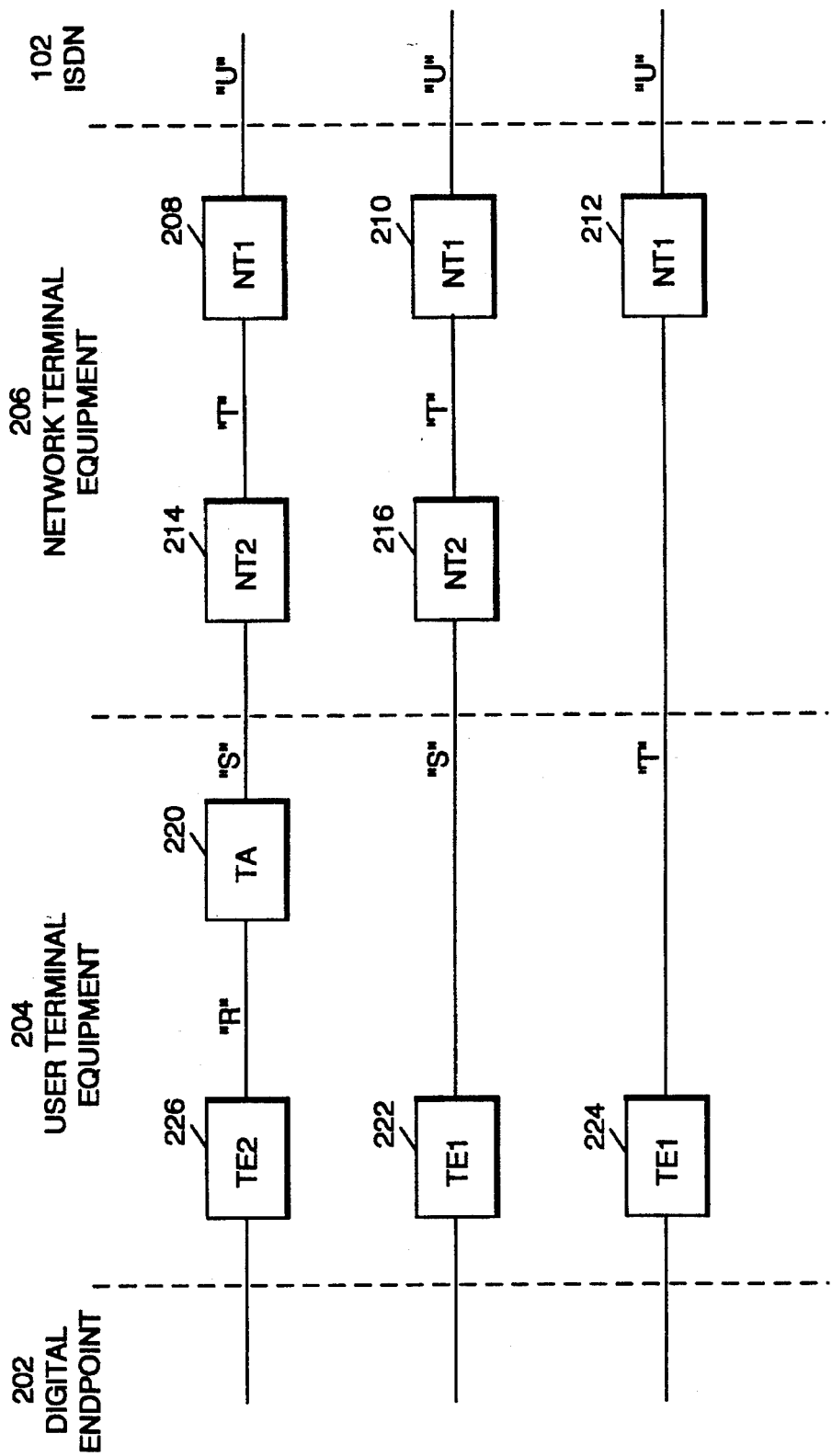
FIG. 2 illustrates the access configurations for interfacing with ISDN.

FIG. 2 illustrates the access configurations for interfacing with ISDN 102. The interface between digital endpoint 202 and ISDN 102 is divided into two sections. User endpoint 202 is coupled to user terminal equipment 204. The digital endpoint 202 is the point of interface between the ISDN equipment and the PC or workstation. User terminal equipment 204 is then coupled to network terminal equipment 206 which is, in turn, coupled to ISDN 102.

The components illustrated in FIG. 2 fall into a number of functional groupings. There are NT1 network terminals 208,210,212; NT2 network terminals 214,216; terminal adapter 220; TE1 terminal equipment 222,224; and TE2 terminal equipment 226. Each of these will be discussed below.

The functions of the components also define, by implication, a set of standard reference points which are useful in describing the ISDN interface. As shown in FIG. 2, they are labeled "R", "S", "T", and "U," each representing a different point along the interface between user endpoint 202 and ISDN 102.

Network Termination 1 (NT1) network terminals 208, 210,212 include functions associated with the physical and electrical termination of the ISDN network 102 on the user's premises. NT1 forms a boundary with the network which isolates user endpoint 202 from the transmission technology of the ISDN network.

Network Termination 2 (NT2) network terminals 214,216 are intelligent devices which can perform switching and concentration functions. Examples of NT2 are digital PBX and multiplexers.

There are two types of ISDN terminals: Terminal Equipment 1 (TE1) and Terminal Equipment 2 (TE2). TE1 ISDN terminals 222,224 are designed for direct attachment to an ISDN network. Examples are a digital telephone, integrated voice/data terminal, and digital facsimile equipment.

TE2 terminal 226 encompasses existing non-ISDN equipment that requires a protocol-converter referred to as a Terminal Adapter (TA) 220 to interface with an ISDN interface. Terminal equipment such as TE2 226 were originally designed to be connected to the analog Public Switched Telephone Network (PSTN) via modem. Examples of the interface between TA 220 and TE2 226 are RS-232 and X.21 interfaces. Thus, TE2 226 has the capability of communicating with both analog and digital devices. However, the user endpoint 202 must be connected into an analog modem to achieve analog communications.

Alternatively, if TE2 226 is communicating with an ISDN endpoint, it must be connected into a digital terminal adapter. This reveals the shortcomings of the conventional systems previously described. Two lines must be brought into the user premises, two interfaces are required, and one must manually switch from one interface to the other.

In a preferred embodiment, the adapter of the present invention is implemented in a TE1 terminal equipment 222 with an ISDN "S" Interface port. It is intended as a replacement for higher speed analog modems in applications where data rates to 64 Kbps justify using an ISDN line. Thus, in this preferred configuration, the present invention may be connected to a NT2 network terminal such as NT2 216. Alternative preferred embodiments of the present invention incorporate the present invention in a TE1 user terminal equipment which includes a network terminal NT2. This embodiment will have an ISDN "T" interface port and may be connected to an NT1 network terminal. This is illustrated in FIG. 2 as TE1 224.

As will become apparent to one skilled in the relevant art, the implementation of the adapter of the present invention may be packaged with different functional components in various combinations, including TE1, TE2, TA, NT1, and NT2. For example, if the adapter of the present invention was to be implemented in a computer system having a TE2 with an RS-232 interface, the present invention may be incorporated into a TA.

III. Requirements For A Compatible ISDN Adapter

As described above, the adapter of the present invention is downward application compatible, i.e., compatible with applications programs running on the host workstation/PC; and downward connectivity compatible, i.e., compatible with the endpoint devices. Each of these are discussed below.

A. Downward Application Compatibility

The ISDN adapter of the present invention is completely downward compatible with respect to applications. Downward application compatibility has two parts: physical compatibility and logical compatibility.

Physical compatibility refers to the ability of application programs to physically interface and successfully send data and commands to the adapter. All ISDN TAs meet this criterion, by virtue of their RS-232 (V.24/V.28) connection. Some TE1 devices also meet this criteria, depending upon their implementation.

Logical compatibility refers to the ability of the application program to successfully send commands (specifically, call control) to the adapter. Connectivity to modem applications is achieved via support for the standard COMM Port interface (type 1 or 2) in a PS/2 or other type of personal computer. The adapter provides complete logical compatibility by providing the appearance of a serial port, accepting and responding to AT commands. The adapter of the present invention can support any application that operates through a COMM Port interface connecting to the PSTN interface.

The adapter also supports a high-speed synchronous interface in addition to the COMM PORT interface. This high speed data transfer utilizes more of the facilities of the system bus in the host workstation/PC. Examples of the system bus interface are the ISA bus and the microchannel system buses.

Alternative embodiments of the present invention include the capability to utilize a bus master DMA mechanism for transferring data in parallel between the adapter of the present invention and system memory. This is a more efficient method of transferring data between the system and the adapter since it eliminates the overhead associated with transferring data via the system bus interface. Thus, higher data rates may be achieved. This is not part of the hardware diagrams.

One skilled in the relevant art will find apparent the ability to configure the present invention to utilize other variations of system interfaces. For example, the present invention may be modified to utilize the enhanced version of ISA bus, referred to as EISA. EISA is often utilized in personal computers which are not IBM compatible. In addition, there are several local buses which are evolving for high speed data transfer, such as VISA and PCI. Another alternative embodiment is the personal computer memory card interface adapter (PCMCIA) which includes a credit card-size plug-in adapter.

B. Downward Connectivity Compatibility

Downward connectivity compatibility refers to the ability of the ISDN-connected device to communicate through the network or networks to another ISDN-connected device or to a PSTN-connected device, such as existing modems in the customer network. A network administrator could migrate users or mainframes or concentrators to ISDN gradually while maintaining connectivity. To date, no product with this capability has been introduced.

The adapter of the present invention enables a user to make calls to, and receive calls from, both digital and analog devices. Making and receiving ISDN calls is straightforward and known in the art. To make or receive a call from the analog network, the present invention utilizes digital signal processing algorithms which generate the appropriate waveform, and then encode the waveform digitally, using the format as used in digital portions of the analog network. Thus, the proper waveform will be emitted to the analog modem.

Generation of the appropriate waveforms in a digital signal processor is a generally accepted technique for implementing PSTN modems. The difference in the present invention is that the waveform is transmitted directly to the network in the digitally encoded format, whereas PSTN modems must convert the digital form to analog via an A/D converter. An analogous situation for signals coming to the adapter exists, whereas the adaptor of the present invention accepts digital samples directly from the network, rather than receiving analog signals and using the A/D converter to convert digital samples required for processing by the DSP.

The ISDN adapter has been designed to interwork with today's PSTN. In the PSTN, voice and modem data are carried digitally—8000 eight-bit samples every second. The signal is sampled at the point it enters the network, and reconstructed at the point of exit. In an ISDN, the analog/digital conversions are moved outboard to the telephone instrument. For interworking, conversions at the ISDN end take place in the telephone; at the PSTN end, they take place at the telephone central office. In the adaptor of the present invention, the conversion to or from analog is avoided altogether on the ISDN end.

Alternatively, the adapter encodes and decodes its signals as if they were digital samples of the appropriate analog waveforms to communicate with analog devices. The adapter of the present invention can directly place digital data in an ISDN frame for transmission to other ISDN devices, or it can rate-adapt the data for an endpoint connected through a TA if necessary. This capability is viewed as critical, because of the large installed base of equipment which will migrate to ISDN by a TA.

IV. Hardware Environment

Figure 3:
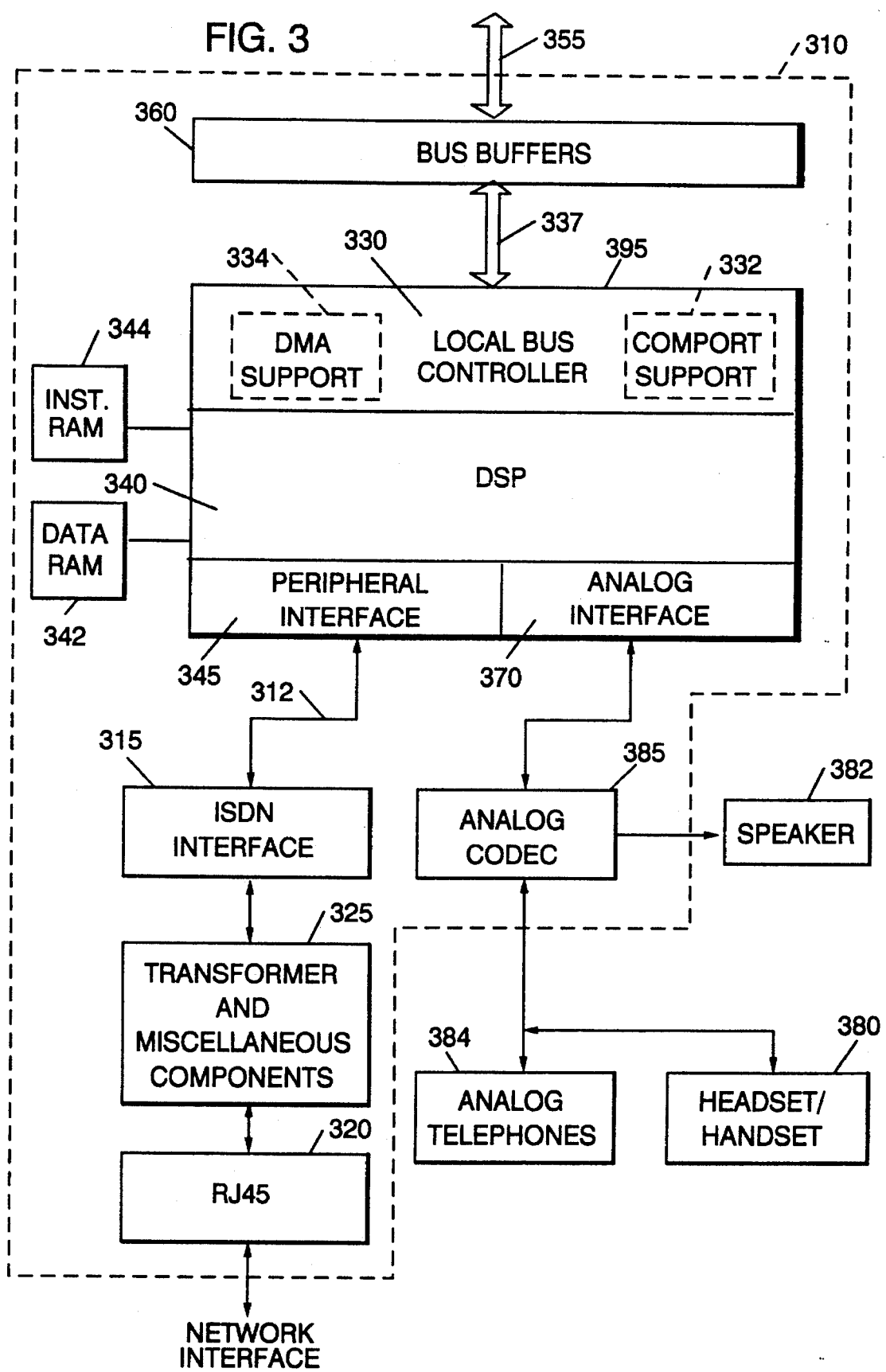
FIG. 3 illustrates a hardware environment of the present invention.

The hardware design of the present invention is illustrated in FIG. 3. The preferred embodiment of the present invention is an integrated adapter 310 for a workstation/PC. As described above, the present invention may also be implemented in a terminal adapter (TA).

The integrated adapter 310 has a single port for an ISDN Basic Rate or other digital interface. This interface includes the ISDN interface hardware 315, the RJ45 connector 320, and the transformer and miscellaneous components 325. The miscellaneous components include such items as surge protection, termination resistors, and capacitors. The RJ45 connector 320, which is well known in the art, is coupled to the ISDN interface 315 through transformer and miscellaneous components 325.

In the preferred embodiment, the ISDN interface hardware 315 is a Siemens PEB-2081 "S/T" Interface Transceiver Chip. However, ISDN interface hardware 315 may be any ISDN transceiver chip. The ISDN interface hardware is configured to output S and T interface formats (see FIG. 2). However, the present invention may be implemented to provide other ISDN interfaces, such as the "U" interface.

As noted above, the preferred embodiment of the present invention operates with 2B+D Basic Rate transmission structure. Thus, peripheral interface 345 is coupled to ISDN interface 315 via digital channel 312. Digital channel 312 multiplexes ISDN B channels, the ISDN D channel, as well as control channels between the peripheral interface 345 and the ISDN interface 315.

The adapter interfaces with a system bus 355 connected to a Workstation/PC via local bus controller 330 and bidirectional bus buffers 360. Bus buffers 360 is connected to the local bus controller 330 via a bus 337. In a preferred embodiment, the bus interface is implemented as either a Micro Channel Bus Master having a 32 Bit Address and 16

Bit Data or an AT Bus Master having 24 Bit Address and a 16 Bit Data. In these preferred configurations, the local bus controller 330 utilizes a COMM port interface support 332, which is well known in the art. Alternatively, local bus controller 330 may utilize a direct memory access (DMA) interface support 334.

When the adapter is configured to be an AT/ISA Bus adapter, the DSP chip is pin-strapped for the alternate bus interface and a different set of bus buffers 560 is used to isolate the adapter card logic from the bus, and a card-mounted speaker 382 is used for call progress monitoring. In the Micro Channel configuration, speaker 382 is a system speaker. The card form-factor is changed to match standard AT/ISA standards. Some changes to device driver and diagnostic code, which should be readily apparent to one skilled in the art, will be required to account for differences between Micro Channel and ISA bus interfaces.

In addition to Micro Channel and AT/ISA, the present invention may be implemented with other types of bus interfaces, such as EISA, PCMCIA, or local buses such as PCI. Alternatively, DSP 340 may be implemented such that it utilizes Bus Master DMA transfers for data movement between the adapter and the system. This further enhances the power of the system.

In the preferred embodiment of the present invention, the DSP 340 is an MWAVE DSP, available from Texas Instruments, Forth Worth, Tex., U.S.A., part number TMS320M500. The MWAVE DSP includes all the elements shown generally as block 395. The MWAVE DSP is also described in U.S. Pat. No. 4,794,517 to Estebon et al., entitled "Three Phased Pipelined Signal Processor." However, as would be readily apparent to one skilled in the relevant art, the present invention may operate with any DSP architecture.

The DSP 340 is coupled to an instruction RAM 344 which, in a preferred embodiment, can store 32K×24 bit instructions. DSP 340 is also coupled to a data RAM 342, which, in a preferred embodiment, can store 32K×16 bits of data.

The adapter 310 includes an analog coder/decoder (codec) 385 which, in the preferred embodiment, is a single chip that combines the analog to digital and digital to analog conversions for the analog telephone 384 or headset/handset 380. Analog codec 385 is also used to interface speaker 382.

The Digital Signal Processor (DSP) 340 of the present invention is implemented with a processor instruction cycle of 60 ns (16.7 MPS). The DSP allows communication use of the D channel (X.25) and both B channels for data transmission.

In a preferred embodiment, voice support for routing one B channel to the headset/handset 380 or to a telephone answering machine (TAM) (not shown) function are implemented. Other voice processing and storage/playback functions can also be implemented as will be apparent to those skilled in the art.

Other options for voice support will be via external devices attached via the "S/T" Interface Passive Bus, such as an ISDN telephone or an NT1 unit which supports an analog POTS (Plain Old Telephone) connection.

A digital ISDN telephone passive bus can be attached, or analog telephones can be connected to a special NT1 that supports the telephone jack. In a preferred embodiment, a handset/headset port is placed on the card enabling the present invention to transmit data on one channel and voice on another.

The network interface complies with CCITT standards (I.430) for the ISDN basic rate interface at the "S/T" reference point (TE1), including Passive Bus connection. The Siemens PEB-2081 will be used for the network interface. VTL logic will convert the synchronous IOM-2 interface (IOM-2 is a time division multiplex interface which multiplexes the B channel with the D channel and the control information into a single serial interface) into the asynchronous AIC interface native to the DSP. AIC-1 on the DSP will be used to connect the network interface to the DSP. A mechanism is implemented which synchronizes a 23.04 MHz clock input to the DSP with the clock signal derived from network timing. This allows an internally generated DSP interrupt to be synchronized with the rate at which data is transferred to and from the network. AIC-2 on the DSP is connected to an analog CODEC chip which provides audio input/output to a headset/handset connector for voice support applications. Audio monitoring of call progress is implemented by connecting the same CODEC output to the system speaker via the Micro Channel Audio pin. The AT/ISA product will include a speaker on the adapter card for monitoring call progress.

V. Software Environment

Figure 4A:
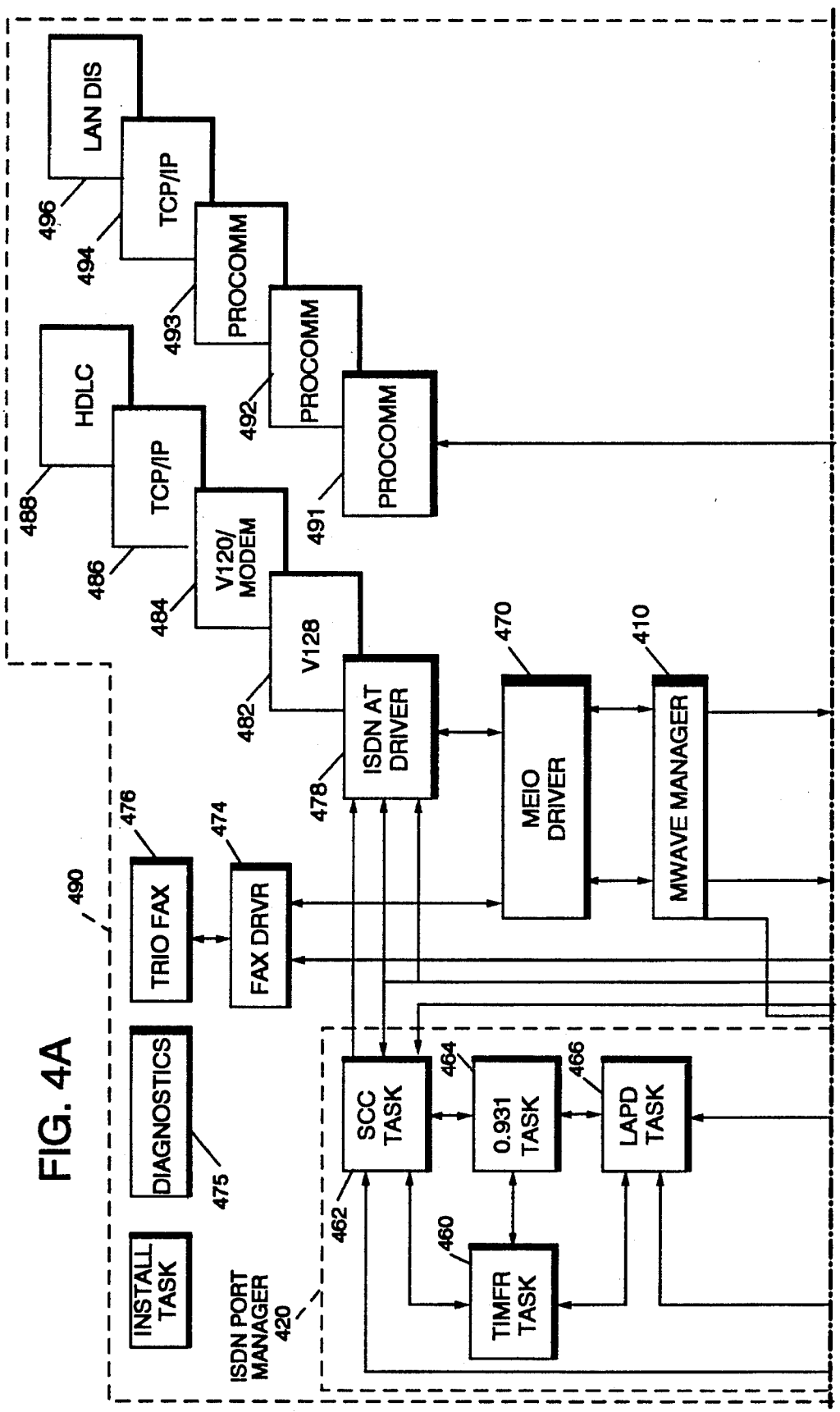
Figures 4, 4C:
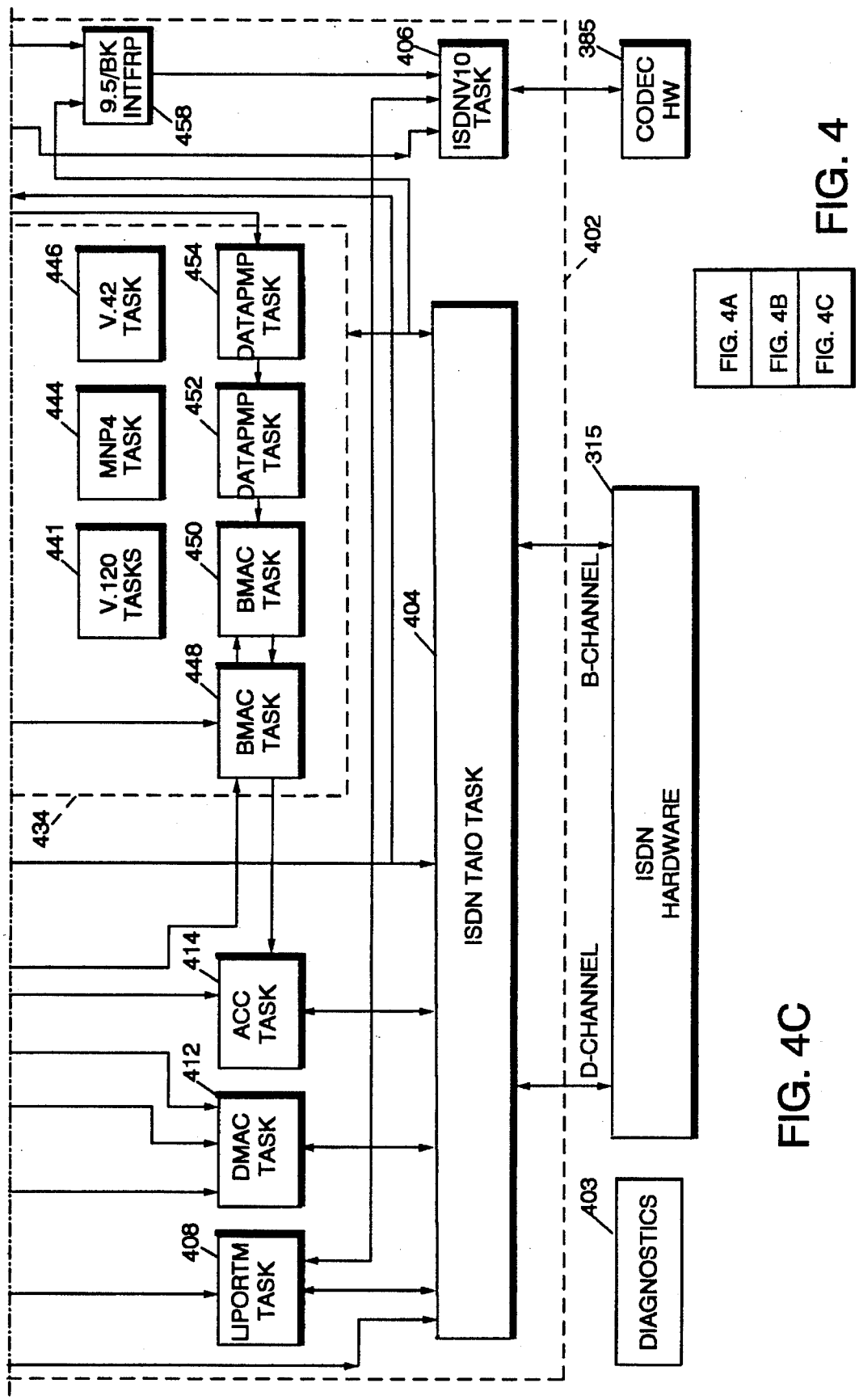

FIG. 4 illustrates a functional block diagram of software executing in DSP 340 and the system processor (not shown). That is, the software environment of the present invention is broken into two section: system software 490 and DSP software 402. As will become readily apparent to one skilled in the art, the functions executing within these sections may be implemented in system software 490, DSP software 402, hardware, or a combination of the three.

Referring to FIG. 4, the software architecture is based upon the MWAVE Communications Subsystem (described below) running on the MWAVE operating system 402 and MWAVE Manager 410. The MWAVE Communications Subsystem includes the modem control (MDMCNTL) task 426, UART task 430, the asynchronous (ASYNC) task 432, and B channel function tasks 434. Task block 434 includes a plurality of tasks that define the B channel functions. Which of these tasks is actually used is dependent on which driver is selected. Furthermore, the ISDN AT driver 478 is also considered part of the MWAVE Communications subsystem.

A. System Software for Basic Functionality

In the preferred embodiment of the present invention, system level software 490 is written in a combination of "C" and assembler programming languages. However, other programming languages now in existence or later developed may be used. In the preferred embodiment of the present invention, the system level software is configured to run in both OS/2 and WINDOWS (under DOS) environments. However, other Workstation or PC environments are equally applicable (e.g., UNIX or Novel Operating Systems).

Referring to FIG. 4, MWAVE DSP manager 410 provides a high level interface to the DSP 340 in adapter 310. An ISDN port manager 420 supports all ISDN call control functions performed by the present invention. ISDN port manager 420 includes system call control (SCC) task 462, timer task 460, Q.931 task 464, LAPD task 466, and D-channel driver 468.

ISDN port manager 420 performs such functions as dialing, answering incoming calls, and providing a mechanism for linking up the required tasks within block 434 (in conjunction with the selected driver, i.e., the ISDN AT driver 478, the Fax driver 474, V120 driver 482, V120MODEM driver 484, the TCP/IP driver 486, or the HDLC driver 488). The selected driver interacts with the ISDN port manger 420 and the MEIO driver 470. The ISDN port manager 420 uses the MWAVE manager 410 as means for accessing DSP resources when it is doing this linking. Thus, the ISDN port manager 420 activates various tasks executing in the MWAVE operating system 402 through MWAVE manager 410. These tasks include PC to General Purpose Connector (GPC) task 416, GPC to PC task 418, DMAC task 412, port monitor task 408, ACC task 414, and the ISDN TAIO task 404. General purpose connector may also be referred to as a circular buffer.

In a preferred embodiment, a facsimile driver 474 is a feature that is implemented in a substantially similar manner as that described in the MWAVE product literature (available from Texas Instruments). The facsimile driver 474 will be loaded when the user selects a FAX function through a graphical user interface. There are a number of user selectable functions for the adapter in addition to the fax driver 474, the user may activate the modem function 478, the V.120 482, the V.120/Modem 484, the TCP/IP 486, or the HDLC 488.

The ISDN AT Driver 478 is modified to connect to the ISDN port manager 420. The ISDN AT driver 478 is also modified to link different tasks running in the DSP 340 to implement other functional drivers (e.g., V.120 482, V.120/Modem 484 etc.).

The drivers 478, 482, 484, 486, 488 activate the modem control function of the ASYNC task 432, and the UART task 430. The ISDN AT Driver 478 activates either the modem data pump task 452 along with MNP4 task 444 and MNP5 task 440 or the modem data pump task 454 along with V.42 task 446 and the V.42 bis task 442. Which of these tasks the ISDN AT driver 478 activates is determined by AT commands which are received through the COM Port 332.

The V.120 driver 482 will activate the BMAC task 450, and the V.120 tasks 441, and optionally may activate the V.42 bis task 438 which is a data compression task. The V.120 modem driver 484 is a combination of those two. Depending upon signals it gets from the ISDN port manager 420, the SCC task 462 will indicate to the V.120/Modem Driver 484 whether it's a voice call or a data call. So this driver will dynamically load and link either the modem tasks or the V.120 tasks, depending upon what the nature of the call.

The TCP/IP driver 486 and the HDLC driver 488 both activate the ADLC task 436 and the BMAC task 448. It turns out that the ADLC task 436 has two different modes. One mode is for the HDLC, and the other mode is for TCP/IP. So the user selection determines which mode the ADLC task 436 is running in. In either mode, the ADLC task 436 converts an asynchronous format designed for a comport interface into a synchronous format required to interpolate with synchronous ISDN devices.

The MWAVE External IO (MEIO) Driver 470 operates with the MWAVE Manager 410 to control availability of adapter 310 I/O ports. In other words, it manages the resources of the adapter 310. The MWAVE MEIO driver 470 reserves the resources that a particular task requires. Since these resources are provided in hardware, the MWAVE MEIO driver 470 is hardware dependent. Thus each hardware design has a unique MEIO driver 470.

In the preferred embodiment of the present invention, the MWAVE MEIO driver 470, configured to DSP 340, supports various telephone interfaces requiring different peripheral interfaces. The MEIO driver 470 is unique for a particular adaptor 310 in order identify to applications programs what physical resources are available for peripheral interfaces and manage these interfaces in those situations where multiple applications requiring the same physical resources occurs. For example, if the ISDN AT driver 478 is already active and then the V.120 driver 482 requests to be activated, the MEIO driver 470 will respond to the V.120 driver that the resources are in use. The MEIO Driver 470 is configured to manage the peripheral interface 345 and the analog interface 370, controlling access to those resources.

The ISDN Protocol Code (i.e., the Q.931 task 464 and LAPD task 466) implements a Q.931 task 464, which is well known in the art. Q.931 task 464 supports the dialing, call progress, answering, and call termination requirements of ISDN. ISDN Protocol Code supports the presently existing and well known AT&T 5E7 and NT BCS-33 ISDN code releases, as well as National ISDN1. Support for European countries and Japan is also provided. Q.931 task 464 will have a connection across the system bus 355 to the ISDN TAIO task 404 and call progress function within the modem datapump task 452, 454 via an Adapter Call Control (ACC) task 414 and the SCC task 462.

Link Access Procedure for the D channel (LAPD) task 466 resides in ISDN port manager 420 and is directly linked to the Q.931 task 464. The LAPD task 466 interfaces across the system bus 355 to the DMAC task 412 via the D Channel Driver 468 and the PC to GPC task 416 and the GPC to PC task 418.

Facilities are implemented in the adapter of the present invention to configure the adapter 310 for the appropriate ISDN network. Configuration for the B channel, which is well known in the art, is also required. In the preferred embodiment of the present invention, the following B channel options are included: Modem, V.120, SDLC over ASYNC translation to standard SDLC, V.120/V.42 bis, Auto selection via Q.931 response (Modem vs. 56/64 Kbps Digital), and FAX. These are all selected by a graphical user interface using a pointing device to click on the icon corresponding to the driver desired.

The adapter 310 of the present invention operates on an ISDN network B channel. However, as one skilled in the relevant art would find apparent, the present invention may operate on any digital link which has the characteristics of being able to carry, or represent, voice-band-to-analog signals as digitized samples of these signals. For example, the present invention may operate on a Switched 56 communication link. For example, referring to FIG. 1, the present invention is illustrated communicating with a workstation over a Switched 56 communication link which is connected to an ISDN network. This is possible since the present invention has the ability to communicate over a single digital channel.

Diagnostics 475 must be supplied with the adapter 310, which will include the well known .DGS and .ADF files required for Micro Channel adapters. Other types of files are required for other types of system interfaces.

The TRIO FAX 476 is an application program for executing facsimiles. This application program is modified to interact with the MWAVE interface that is provided by the fax driver 474.

B. DSP Software Basic Functionality

The microcode which will run on the DSP consists of existing MWAVE tasks (i.e., tasks which are defined in the MWAVE literature available from Texas Instruments), MWAVE tasks which require modification, and new tasks unique to the ISDN environment.

To insure compatibility with the existing MWAVE tasks (i.e., ability to synchronize GPCs), all real-time tasks will be run under the 9.6 KHz interrupt. Frame manager selection should consider the rate at which data is being processed by the ISDN TAIO task 404. (Frame 6 with the 9.6 KHz interrupt processes 5 bytes per B channel, making N×6 a convenient frame size to process N×5 bytes.) The various DSP tasks communicate with each other and to tasks running in the PC using circular buffer structures in DSP memory, and also control block structures in DSP memory.

The MWAVE Operating System is used to control the execution of tasks in the DSP 340.

The VIO BIOS task supports the Log-PCM CODEC chip connected to the AIC2 port of the DSP chip. This interface is used to route call progress tones to the system speaker (Micro Channel Card) or card-mounted speaker (AT/ISA Card) curing call setup.

The MWAVE FAX subsystem 474, 476 424, and 422 is integrated into adapter 310 of the present invention unchanged. The TRIO FAX 476 is modified to interact with the MWAVE interface that is provided by the fax driver 474. The MWAVE FAX subsystem supports CCITT T.30 FAX standards for G-III. According to requirements of a specific environment, all or some subset of the functionality described in these standards could be included in the implementation of adapter 310.

When configured for Modem Control, or FAX, the ISDN AT driver 478 or FAX driver 474 is used on the system software 490. When configured for 56/64 Kbps Digital Interface or Auto Selection via Q.931 response, the Modem Control Task 426 must connect the high-speed protocol tasks to the UART task 430, using the same connections the modem data pump 452, 454 would use to connect to the UART task 430. Additional drivers control the required linking for other functions.

The ISDN TAIO task 404 replaces the TAIO task used in MWAVE, and masks the uniqueness of the ISDN interface from modem or FAX data pumps. The ISDN TAIO task 404 interfaces to the AIC1 hardware via a 128 word circular buffer with a hardware driven pointer. Input and output samples are interleaved within the same buffer. New samples are loaded into and unloaded from the buffer at a rate of 32000 bytes per second in each direction. Each data byte is loaded in the low byte of a DSP word; the high byte is used for synchronization to the ISDN framing.

The ISDN TAIO task 404 must de-multiplex this interface into four distinct channels corresponding to the ISDN D channel, two B channels, and one channel for layer 1 maintenance and control functions. In modem/FAX applications, the ISDN TAIO task 404 must convert ulaw (or Alaw in Europe) samples into linear samples for one of the two B channels coming in.

Subsequent processing will convert 5 samples at 8 KHz into 6 samples at a phase-locked 9.6 KHz rate via an Interpolation/Decimation task to satisfy the modem data pump interface requirements. Interpolation decimation is a well known in the art for sample rate conversion. This dictates the hardware requirement to phase-lock the 23.04 MHz clock input to the DSP (used to generate the 9.6 KHz interrupt to the DSP via internal counter) with the ISDN network clocking so that the interpolation decimation process will be synchronous. It also dictates that the BIOS task runs under the 9.6 KHz Interrupt with a frame size of 6. The frame size is chosen to ensure transmit and receive buffers will not overflow.

The interpolator/decimeter task which exists today runs in frame 24, so it will only need to be activated once every 4 passes through the ISDN TAIO task 404. This may provide incentive to break out the Interpolation/Decimation as a separate task, but the 8 KHz interface must use an ITCB (as a control block) rather than the GPC circular buffer in order to minimize latency. Alternately, the Interpolation/Decimation process could be more efficiently imbedded into the modem receive and transmit filters. The development effort required for this option may be prohibitive.

The other channels de-multiplexed by the ISDN TAIO task 404 will be interfaced directly to GPCs for connection with other tasks (i.e., D channel MAC, B channel protocol, Layer 1 maintenance and control). Either B channel must be connectable to either the loaded modem data pump or the loaded B channel data protocol, depending on configuration and Q.931 responses from the network.

In addition to the data paths provided by the ISDN TAIO task 404, a control path must be provided between the modem control task 426 and the Q.931 task 464 via the existing dialing interface between Modem control and TAIO tasks 404. Both Tone and Pulse dialing commands should be supported across this interface. The ISDN TAIO 404 must also respond to Q.931 call progress responses by generating the appropriate audio tones and placing them on the input GPC buffer connected to the modem data pump and call progress tasks. These tones are also routed to the VIO BIOS task for routing to the system speaker (Micro Channel Card) or card-mounted speaker (AT/ISA Card).

Generation of the following tones are provided: DTMF dialing, Dial tone, Ring back, Busy, Congestion (Fast Busy), Invalid Number DTMF. Dialing and ring back may be eliminated or terminated early because ISDN calls can typically be originated more rapidly than their analog counterparts.

The ACC task 414 running in the DSP software 402 is the primary interface between the ISDN AT Driver 478 in the system software 490 and the other tasks in DSP software 402.

V.120 Rate Adaptation is one B channel protocol option which may be selected at configuration time. It will encapsulate a string of characters from the COMM Port 332 into an HDLC-like frame for transmission over the synchronous network. A Multi-frame acknowledge option is used to provide error recovery. This function is performed by V.120 task 441 when a user selects the multi-frame acknowledge mode, as opposed to basic mode of operations. The end of a frame will be determined by detecting a forwarding character (e.g., Carriage Return), by accumulating a maximum-sized frame from the COMM Port 332, or by reaching a time-out condition (from the time the first byte was received from the COMM Port 332), whichever comes first. Timer and frame size parameters will be configuration parameters.

Several drivers exist for using SDLC-like protocols over an asynchronous COMM Port/Modem interface. Examples are NS DOS and the IBM LAN Distance program Product 496 (with possible extensions to OS/2 COMM Manager via an NDIS interface). These drivers calculate the CRC for a data packet and then add transparency control characters as defined in ISO standard 3309 to allow these packets to be sent via Start-Stop Asynchronous links. When this protocol is selected during configuration, the Asynchronous converter for DLC (ADLC) task 436 receives bytes from the UART/Modem Control task 430, removes the transparency control characters, implements the standard HDLC bit insertion function, and after a complete frame is buffered in DSP RAM 342, the task will transmit the frame on the selected B channel. Frame buffering is required in order to avoid transmit underrun.

On the receive side (e.g., each box in FIG. 4 is considered full duplex), after zero bit deletion the appropriate transparency control characters will be added to accommodate the application driver before returning the data through LAN distance Program 496 (or whatever application program, e.g. 490–496, is currently running in the system processor (not shown)). CRC is generated and checked by the COMM Port driver portion 496 of the application running in the system processor. This function will enable the adapter 310 to support a OS/2 COMM Manager (not shown) to achieve connectivity to existing synchronous ISDN adapters.

MNP4 task 444 and MNP5 task 440 already exist for modem connections, and may be used to communicate with analog modems. MNP4 task 444 is for error recovery and MNP5 task 440 is a data compression protocol. V.42 task 446 and V.42bis task 438, 442 also already exist for modem connections, and may be used to communicate with analog modems. Furthermore, the V.42bis task 438, 442 may be used for ISDN compression, on the V.120 task 441. V.42bis task 438, 442 is capable of up to 4:1 compression (on optimal source), providing up to 512 Kb/s user data rate, if two B-channels are used concurrently.

The B Channel MAC 424 and the D Channel MAC task 426 each provide bit insertion/deletion, CRC generation/checking, and flag detection for the respective channel protocol. This should be a generic MAC which can also be used for V.120, SDLC over ASYNC, and other B Channel protocols as they are developed. A unique interface may be required for the D Channel since the LAPD 466 state machine on the system side requires Micro Channel Bus Master transfers to interact between the system and the DSP 340 on the adaptor 310.

The ISDNVIO task 406 is a software interface that connects the MWAVE operating system 402 to the headset/handset 380 and speaker 382. Connected thereto are blocks 456 and 458 that aid in modem transactions.

Application programs 490–496 connect directly to the MWAVE operating system through COM PORT 332.

The Layer 1 Port Monitor task 408 will interface to the ISDN Port Manager 420 and Call Control code in the system software 490, and is used to control the Siemens PEB-2081 interface chip. This includes control of Command/Indicate and maintenance I/O bits on the IOM interface, as well as initialization of the interface at power-on time.

DSP diagnostics 403 will run in conjunction with the card-level diagnostics 475 discussed previously. The diagnostics 403 include MWAVE routines to check out the DSP 340 as well as routines to exercise the Siemens PEB-2081 interface chip.

ISDN presents some unique diagnostic requirements. In a POTS situation, the user can check the availability of service and the integrity of the connection to the network by merely lifting a telephone handset.

Furthermore, he can check the operation of a modem by merely listening to a call attempt. He can even listen from an extension telephone to verify functionality. In ISDN, most sounds are those produced by the adapter 310 or telephone to mimic the POTS network. One cannot monitor a B-channel from another instrument.

Diagnostics will make up for this system shortcoming by providing additional tests. The diagnostics cause the NT-1 to perform a self-test, report the NT-1 self-test results, perform a data wrap test on either or both B-channels, and report the data wrap results. These diagnostics, in conjunction with the line-status LEDS found on most NT-1s, provide a thorough check.

VI. Applications

Replacing analog technology with technology that can provide up to 512 KB/s promotes the use of two different classes of applications:

(1) Applications that perform poorly using analog technology—e.g., remote control access to file server.
(2) Applications not attempted using analog technology (remote use would be impossibly slow)—e.g., remote X-windows.

This invention allows those applications in the first category to be used in a mixed ISDN/modem environment. The invention allows application users in the second category to communicate with others who do not need those functions.

VII. Alternative Embodiments

The adapter 310 includes a serial port emulation, for application compatibility, and both ISDN and modem connectivity. Alternatively or in addition to the serial port emulation, the adapter 310 may include an AT-bus version to complement the Microchannel version.

Alternative embodiments also include the capability of supporting the transmission and receipt of Group III FAX to the ISDN and PSTN and the transmission and receipt of Group IV FAX to the ISDN.

In addition, the present invention contemplates the use of resident device drivers for OS/2, Windows, and AIX that add a packet-oriented (versus character-oriented) interface, and support Application Programming Interfaces (APIs) such as Network Data Interchange Standard (NDIS) for data, Generic Call Control Interface (GCCI) for call control, ETSI (European Telecommunications Standards Institute) ISDN PCI (Programmable Communications Interface), the North American ISDN Users Forum Application Software Interface (ASI), Sun's Teleservices Programming Interface (TPI), Connectivity to Switched-56 services in North America, support for CCITT Recommendation H.221, Frame Structure for a 64 kbits/s Channel in Audiovisual Teleservices, the enabler for CCITT H.261, p*64 motion video, and multiple channel support for CCITT H.221 and audio, to enable teleconferencing.

As will be readily apparent to those skilled in the art, a variety of additional functionality may be added to FIG. 4 without departing from the spirit and scope of the invention. Specifically, Additional functionality can be added to both the system software 490 and the DSP software 402.

For example, alternative embodiments may replace the COMM PORT interface 332 with a high-performance Bus Master interface which is capable of driving both B Channels at media speed. Such an embodiment is applicable to both MCA Adapter and ISA Adapter.

The ISDN Protocol code can be enhanced to provide additional functions such as supplementary services and X.31 Case B with a single TE1 for the D Channel. A Generic Call Control Interface to Q.931 task 464 can be added to connect the ISDN protocol code to an OS/2 COMM Manager. The interface to Q.931 task 464 must be maintained to allow a FAX application to use one channel while a data connection is maintained on the second channel.

A module can be added which will interface to the NDIS interface of OS/2 COMM Manager for connection to an X.25 protocol stack. This module will translate the LAPD used within the standard X.25 stack into a LAPD compatible header so it can easily be multiplexed into the D channel. The multiplexing function may be distributed between this task and the LAPD task 466 as appropriate.

A B Channel Driver is required to connect the COMM Manager Protocol stack to the adapter 310. The API for interfacing to the Protocol stack is NDIS. This driver will make full use of the Bus Master capability of the MWAVE chip. This code must be re-entrant in order to support multiple sessions. It supports byte-interleaved concatenation of the two B channels into a single higher speed pipe, as well as independent connections on each channel. Throughput support of full media speed with in-line data compression of at least four to one can be provided, with V.42 bis as the intended compression technique.

The UART Task 430 can be replaced by a Bus Master which will connect to a NDIS VMAC Driver in the system software 490. Interfaces to the Modem Control Task 426 will be maintained so the rest of the modem related tasks can be used without change. This creates a high performance bus transport mechanism (BTM).

The BMAC Task 450 fused with V.120 in FIG. 4 can be modified to utilize Bus Master data transfers to communicate with the NDIS VMAC Driver via the BTM. The BMAC task 450 will also support interleaved use of two B channels compliant with the Bandwidth On Demand Industry Group (BONDING) standard.

The MWAVE TAM (Telephone Answering Machine) task (not shown) is connected to a VIO BIOS and a ISDNTAIO BIOS Interfaces and to the TAM driver running in the system software. The TAM function will be activated if Q.931 detects an incoming voice call, the modem/voice discriminator indicates that the channel contains speech samples, and the headset/handset 380 is not plugged in. A ringing indication should be sent to the speaker 382 for 2 to 6 rings (configurable) before activation of TAM. If the handset 380 is plugged in prior to the configured number of rings, the B channel will be routed to the headset/handset 380. If the headset/handset 380 is already plugged into the adapter 310 when an incoming call is received, and it is determined to be a voice call, the ringing indication will be sent to the speaker 382 for only one ring, after which the call will be connected to the headset/handset 380.

If a dialing application requests a voice connection, the ISDN protocol will request B channel service. Once the B channel has been allocated by the switch for the voice call, the headset/handset 380 will be routed to that B channel. Call progress tones will be routed to both the headset/handset 380. (Tones may be a combination of actual tones from the network and internally generated tones based on Q.931 responses from the network.)

Adapter Call Control (ACC) task 414 can be upgraded to handle the added connectivity options of multiple B channels.

ISDN TAIO 404 can be enhanced to support multiple B channels. Additional updates may be required to support the voice functions (i.e., detect presence of handset/headset 380, route B channel to voice task or ISDNVIO task 406).

While the invention has been particularly shown and described with reference to preferred embodiments thereof, it will be understood by those skilled in the art that the foregoing and other changes in form and details may be made therein without departing from the spirit and scope of the invention.

Having thus described our invention, what we claim as new and desire to secure by Letters Patent is:

1. A system for providing information telecommunication services between a computing device and a selected one of plurality of diversely equipped analog and digital devices remotely linked to said computing device through parts of a public switched network, said computing device being required to be able to process information contained in signals transferred to said computing device via said network, said system comprising:

a single digital channel for carrying signals between said computing device and said network; said digital channel carrying digitized log PCM signals representing diverse types of information when said remote device is an analog device in nature, said digital channel carrying various other digitally formatted signals when said remote device is a digital device in nature said log PCM signals being incompatible in form with information signal processing requirements of said computing device, and therefore the information content of said signals is not directly processable by said computing device while said signals are in said log PCM forms, wherein said digital channel is connected to said network via a data link; and digital signal processing means for coupling said computing device with said digital channel for exchanging signals in diverse signal forms compatible with requirements of said remote devices, and for exchanging signals with said computing device in forms directly compatible with information processing requirements of said computing device but incompatible with signalling requirements of said remote devices, and for converting said signals in transit between said computing device and said digital channel into forms respectively compatible with said signalling requirements of said devices and said computing device, wherein said computing device comprises, a system manager configured to provide a high level interface to said digital signal processor means, a port manager configured to support all call control functions performed by said digital signal processor means, and a plurality of drivers, coupled to said port manager and said system manager, for activating tasks in said digital signal processing means to dynamically support telecommunication with said remote devices.

2. The system according to claim 1, wherein said data link is an ISDN "B" channel and one of said plurality of drivers is an ISDN driver.

3. An computing device adapter card for providing information telecommunication services between the computing device and a selected one of plurality of diversely equipped analog and digital devices remotely linked to the adopter card through a public switched network, the adaptor card being required to be able to process information contained in signals transferred to the adaptor card via the public switched network, the adaptor card comprising:

a single digital channel for carrying signals between the computing device and the network, said digital channel carrying digitized log PCM signals representing diverse types of information when the remote device is an analog device, and said digital channel carrying various other digitally formatted signals when the remote device is a digital device, said log PCM signals being incompatible in format with information signal processing requirements of the computing device, wherein said digital channel is connected to the via a data link; and digital signal processing means coupled to the computing device via a bus interface and also coupled to said digital channel for exchanging signals in diverse signal formats compatible with requirements the remote devices, and for exchanging signals with the computing device in formats directly compatible with information processing requirements of the computing device but incompatible with signalling requirements of the remote devices, and for converting said signals in transit between the computing device and said digital channel into formats respectively compatible with said signalling requirements of the remote devices and the computing device, wherein said digital signal processing means comprises, a system manager configured to provide a high level interface to the computing device, a port manager configured to support all call control functions performed by said digital signal processor means, and a plurality of drivers, coupled to said port manager and said system manager, for activating tasks in said digital signal processing means to dynamically support telecommunication with the remote devices.

4. The adapter card of claim 3, wherein said data link is an ISDN "B" channel and one of said plurality of drivers is an ISDN driver.

* * * * *